US011215238B2

(12) United States Patent
Bortoli et al.

(10) Patent No.: US 11,215,238 B2
(45) Date of Patent: Jan. 4, 2022

(54) WET CLUTCH ASSEMBLIES

(71) Applicant: Hamilton Sundstrand Corporation, Charlotte, NC (US)

(72) Inventors: Stephen Michael Bortoli, Roscoe, IL (US); Aaron M. Finke, Janesville, WI (US); Mark J. Franklin, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 155 days.

(21) Appl. No.: 16/388,016

(22) Filed: Apr. 18, 2019

(65) Prior Publication Data

US 2020/0332842 A1   Oct. 22, 2020

(51) Int. Cl.
| | | |
|---|---|---|
| F16D 13/74 | (2006.01) | |
| F02C 7/16 | (2006.01) | |
| F16D 13/52 | (2006.01) | |
| F16D 13/72 | (2006.01) | |
| F16D 25/12 | (2006.01) | |
| F16D 21/06 | (2006.01) | |
| F16D 48/02 | (2006.01) | |

(52) U.S. Cl.
CPC ............. *F16D 13/74* (2013.01); *F02C 7/16* (2013.01); *F16D 13/52* (2013.01); *F16D 13/72* (2013.01); *F16D 25/123* (2013.01); *F16D 2021/0676* (2013.01); *F16D 2048/0209* (2013.01); *F16D 2048/0287* (2013.01); *F16D 2300/26* (2013.01)

(58) Field of Classification Search
CPC .......... F16D 13/52; F16D 13/72; F16D 13/74; F16D 25/0638; F16D 25/125; F16D 2048/0209; F16D 2048/0287; F16D 2021/0676; F16D 2300/26; F02C 7/16
See application file for complete search history.

(56) References Cited

U.S. PATENT DOCUMENTS

| | | | |
|---|---|---|---|
| 4,566,572 A | * | 1/1986 | Flotow ................. F16D 25/0638 |
| | | | 192/70.12 |
| 6,464,059 B1 | | 10/2002 | Kundermann et al. |
| 6,810,772 B2 | | 11/2004 | Hori et al. |

(Continued)

FOREIGN PATENT DOCUMENTS

| | | |
|---|---|---|
| EP | 2719912 A2 | 4/2014 |
| FR | 2557941 A1 | 7/1985 |
| GB | 2219638 A | 12/1989 |

OTHER PUBLICATIONS

Extended European search report issued in corresponding EP application No. 19210461.0, dated Jul. 1, 2020.

*Primary Examiner* — Charles A Fox
*Assistant Examiner* — Lori Wu
(74) *Attorney, Agent, or Firm* — Locke Lord LLP; Daniel J. Fiorello; Gabrielle L. Gelozin

(57) ABSTRACT

A wet clutch assembly can include a clutch pack having a plurality of friction members attached to a first clutch housing and a plurality of separator members attached to a second clutch housing. The friction members and the separator members can be configured to be selectively contacted to each other to engage the first housing member to the second housing member. The clutch pack can be in fluid communication with a lubrication source such that a lubrication flow can flow to the friction members and the separator members to remove heat and/or debris therefrom.

8 Claims, 8 Drawing Sheets

(56) References Cited

U.S. PATENT DOCUMENTS

| | | | |
|---|---|---|---|
| 6,840,363 | B2 | 1/2005 | Braford, Jr. et al. |
| 8,840,505 | B2 | 9/2014 | Frait |
| 9,453,540 | B2 | 9/2016 | Agner et al. |
| 9,534,640 | B2 | 1/2017 | Bouton et al. |
| 10,190,644 | B1 | 1/2019 | Logan et al. |
| 2011/0290361 | A1* | 12/2011 | Anderson ............. F16L 27/087 138/114 |
| 2013/0334360 | A1* | 12/2013 | Norem ................ F16D 25/0638 244/17.11 |
| 2015/0057123 | A1* | 2/2015 | Phelps ................. F16D 25/123 475/160 |
| 2017/0327241 | A1* | 11/2017 | Mitrovic ................ B64D 27/10 |

* cited by examiner

WET CLUTCH ASSEMBLIES

BACKGROUND

1. Field

This disclosure relates to transmission systems, e.g., for aircraft low speed spool turbomachines.

2. Description of Related Art

Moving engine accessories to the low speed spool requires a speed converting transmission to take a large speed ratio and turn it into a tighter speed ratio band. One method of doing this is the use of a shifting transmission consisting of clutches that selectively engage different gear ratios. These clutches need to be selectively open or closed such that they can transmit or not transmit torque on a command.

Such conventional methods and systems have generally been considered satisfactory for their intended purpose. However, there is still a need in the art for improved clutch assemblies. The present disclosure provides a solution for this need.

SUMMARY

A wet clutch assembly can include a clutch pack having a plurality of friction members attached to a first clutch housing and a plurality of separator members attached to a second clutch housing. The friction members and the separator members can be configured to be selectively contacted to each other to engage the first housing member to the second housing member. The clutch pack can be in fluid communication with a lubrication source such that a lubrication flow can flow to the friction members and the separator members to remove heat and/or debris therefrom.

The assembly can include a shaft defining a shaft channel and one or more clutch lubrication holes defined through the shaft and positioned and configured to allow lubrication flow to travel to the clutch pack from the shaft channel. The lubrication source can be in fluid communication with the shaft channel.

The first clutch housing can be an outer clutch basket and the second clutch housing is an inner clutch basket. The inner clutch basket can include one or more flow holes defined through a bell flange of the inner clutch basket to allow lubrication flow from the shaft to pass through the bell flange of the inner clutch basket and into the clutch pack.

The inner clutch basket can include one or more end lips configured to retain lubricant axially over the flow holes of the inner clutch basket, e.g., to improve lubricant distribution over the flow holes. In certain embodiments, the one or more clutch lubrication holes can be axially located within the axial length of the bell flange. The outer clutch basket can include one or more exit holes defined through an outer bell flange thereof configured to allow lubrication flow to exit the clutch pack.

The assembly can include one or more hydraulic ports defined through the shaft and a porting manifold disposed at least partially within the shaft channel. The porting manifold can include a control pressure path in fluid communication with the one or more hydraulic ports and a lubrication flow path in fluid communication with the one or more clutch lubrication holes (e.g., the one or more clutch lubrication holes). The control pressure path and the lubrication path can be fluidly isolated in the porting manifold.

In accordance with at least one aspect of this disclosure, a clutch basket for a wet clutch can include a bell flange, a support, and an inner diameter flange connected to the bell flange by the support, and one or more flow holes defined through the bell flange of the clutch basket to allow lubrication flow from a shaft to pass through the bell flange of the clutch basket (e.g., and into the clutch pack or out of the clutch pack). The clutch basket can be an outer clutch basket or an inner clutch basket, for example.

An inner clutch basket can include one or more clutch lubrication holes defined through the inner diameter flange to allow lubrication flow from the shaft. The inner clutch basket can include one or more end lips configured to retain lubricant axially over the flow holes of the inner clutch basket to improve lubricant distribution over the flow holes. The one or more clutch lubrication holes can be axially located within the axial length of the bell flange.

In accordance with at least one aspect of this disclosure, an aircraft turbomachine transmission can include a wet clutch assembly. The wet clutch assembly can include any suitable wet clutch assembly disclosed herein (e.g., as described above).

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
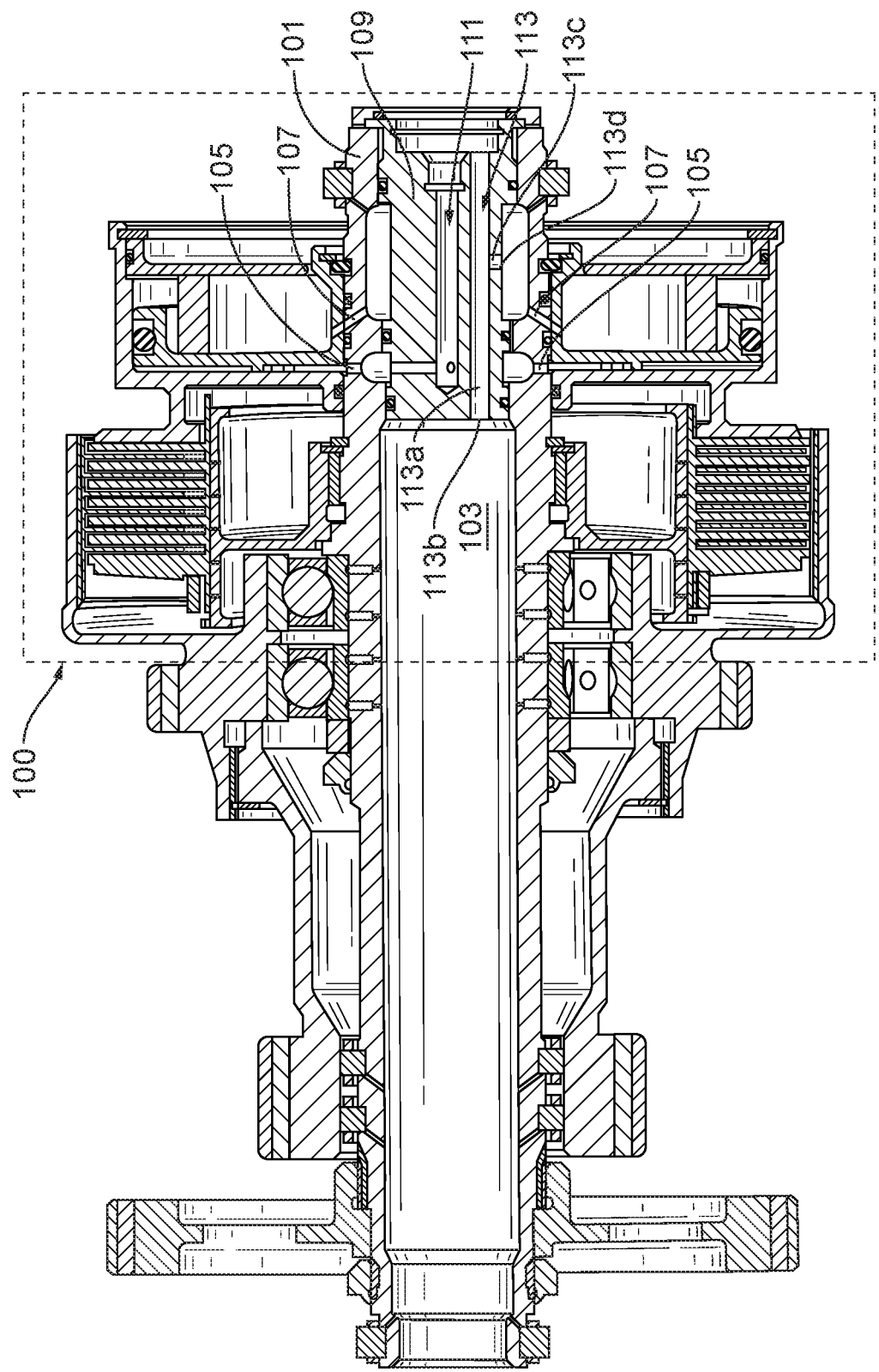
FIG. 1 is a cross-sectional view of an embodiment of a clutch assembly disposed on an embodiment of a shaft in accordance with this disclosure.

Reference will now be made to the drawings wherein like reference numerals identify similar structural features or aspects of the subject disclosure. For purposes of explanation and illustration, and not limitation, an illustrative view of an embodiment of a hydraulic clutch assembly in accordance with the disclosure is shown in FIG. 1 and is designated generally by reference character 100. Other embodiments and/or aspects of this disclosure are shown in FIGS. 2-10.

Referring to FIGS. 1-10 generally, a hydraulic clutch assembly 100 can include a shaft 101 defining a shaft channel 103, one or more hydraulic ports 105 defined through the shaft 101, and one or more lubrication holes 107 defined through the shaft 101. Any other suitable holes and/or construction is contemplated herein.

As shown in FIG. 1, a porting manifold 109 can be disposed at least partially within the shaft channel 103. The porting manifold 109 can include a control pressure path 111 in fluid communication with the one or more hydraulic ports 105 and a lubrication flow path 113 in fluid communication with the one or more lubrication holes 107. As shown, the control pressure path 111 and the lubrication path 113 can be fluidly isolated in the porting manifold 109.

Figure 2:
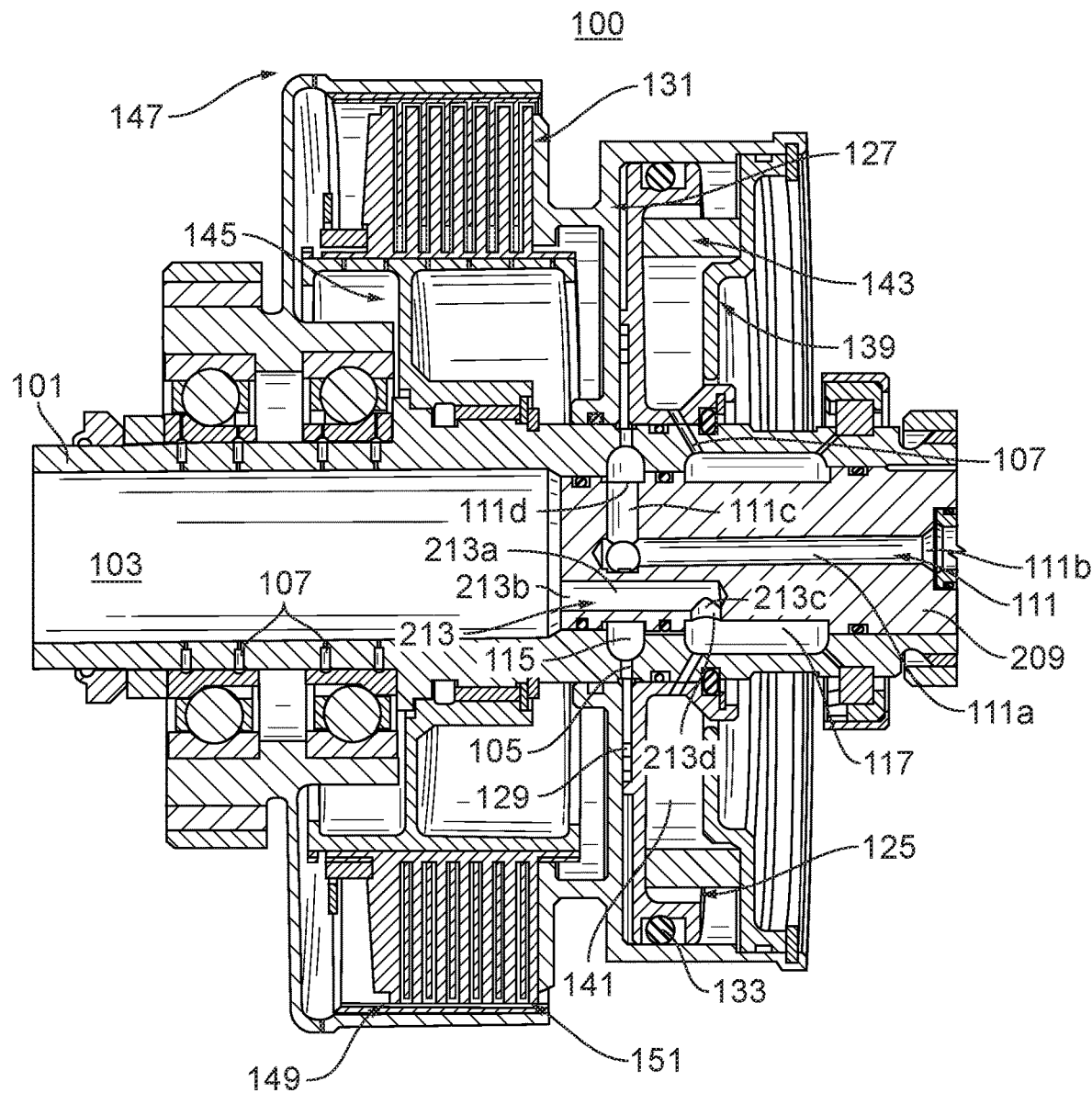
FIG. 2 is a partial cross-sectional view of the clutch assembly of FIG. 1, shown having another embodiment of a porting manifold in accordance with this disclosure.

FIG. 2 shows another embodiment of a porting manifold 209 that is similar to manifold 109, except that the lubrication flow path 213 does not pass all the way through the manifold 213 (e.g., such an embodiment can be fed lubrication oil from the shaft, left of the manifold as shown). Any other suitable paths and/or arrangement thereof are contemplated herein.

Figure 3:
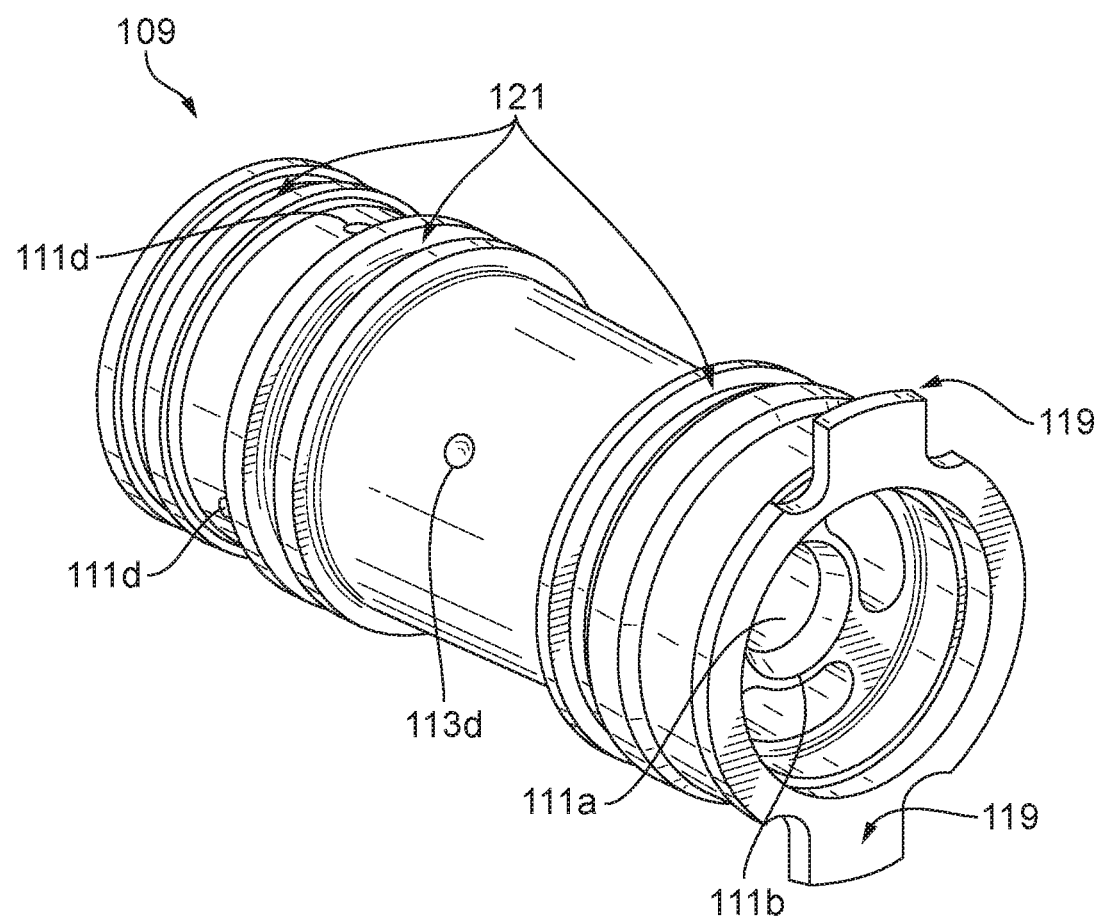
FIG. 3 is a perspective view of the embodiment of the porting manifold shown in FIG. 1.
Figure 4:
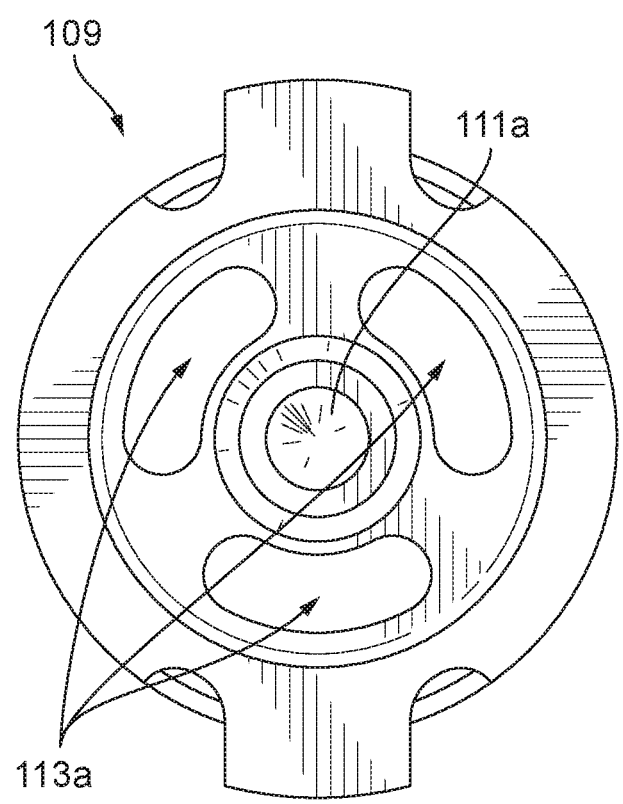
FIG. 4 is a plan view of the embodiment of FIG. 3.

Referring additionally to FIGS. 3 and 4, the control pressure path 111 can include a central axial channel 111a defined partially along an axial length of the porting manifold 109, 209 from a control pressure inlet 111b of the porting manifold 109, 209. The control pressure path 111 can include one or more radial channels 111c defined radially from the central axial channel 111a to a respective control pressure outlet 111d of the porting manifold 109, 209. The shaft 101 can include a control pressure annulus 115 in fluid communication with the one or more control pressure outlets 111d of the one or more radial channels 111c. The one or more hydraulic ports 105 can be in fluid communication with the control pressure annulus 115.

The lubrication flow path 113, 213 can include one or more axial lubrication channels 113a, 213a defined at least partially along an axial length of the porting manifold 109, 209 from a lubrication flow inlet 113b, 213b of the porting manifold 109, 209. The lubrication flow path 113, 213 can include one or more radial lubrication channels 113c, 213c defined radially from a respective axial lubrication channel 113a, 213a to a respective lubrication flow outlet 113d, 213d of the porting manifold 109, 209. The shaft 101 can include a lubrication flow annulus 117 in fluid communication with the one or more lubrication flow outlets 113d, 213d of the one or more radial channels 213c. One or more lubrication holes 107 of the one or more lubrication holes can be in fluid communication with the lubrication flow annulus 117.

Figure 5:
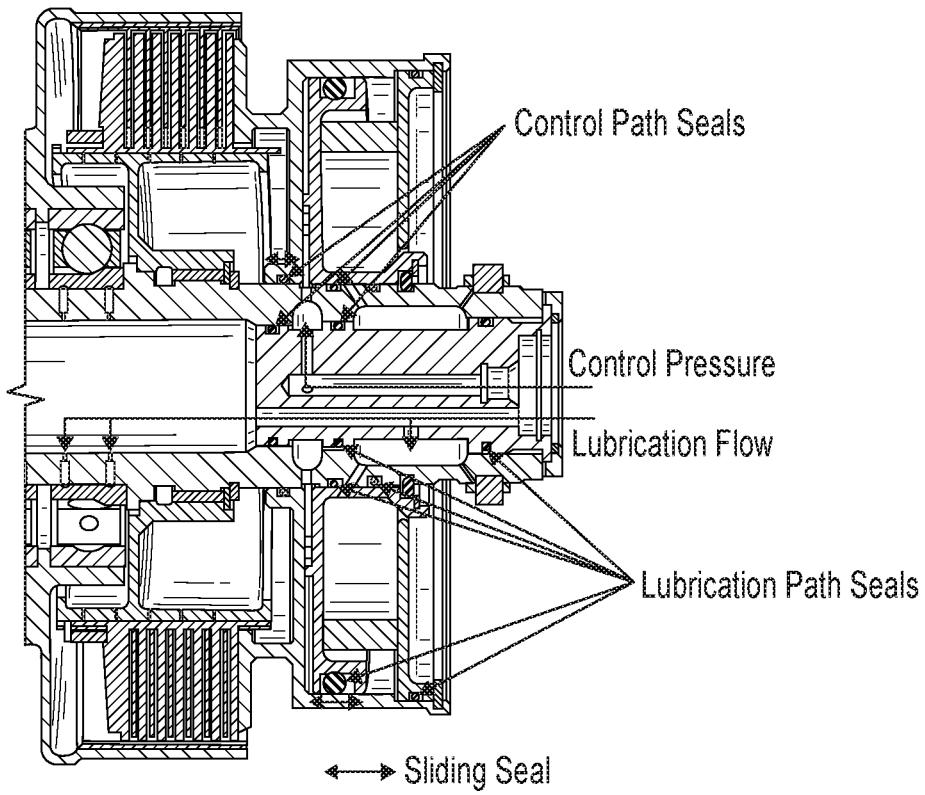
FIG. 5 is a cross-sectional view of the embodiment of FIG. 1, showing flow lines of control pressure and lubrication flow through the porting manifold of FIGS. 3 and 4.
Figure 6:
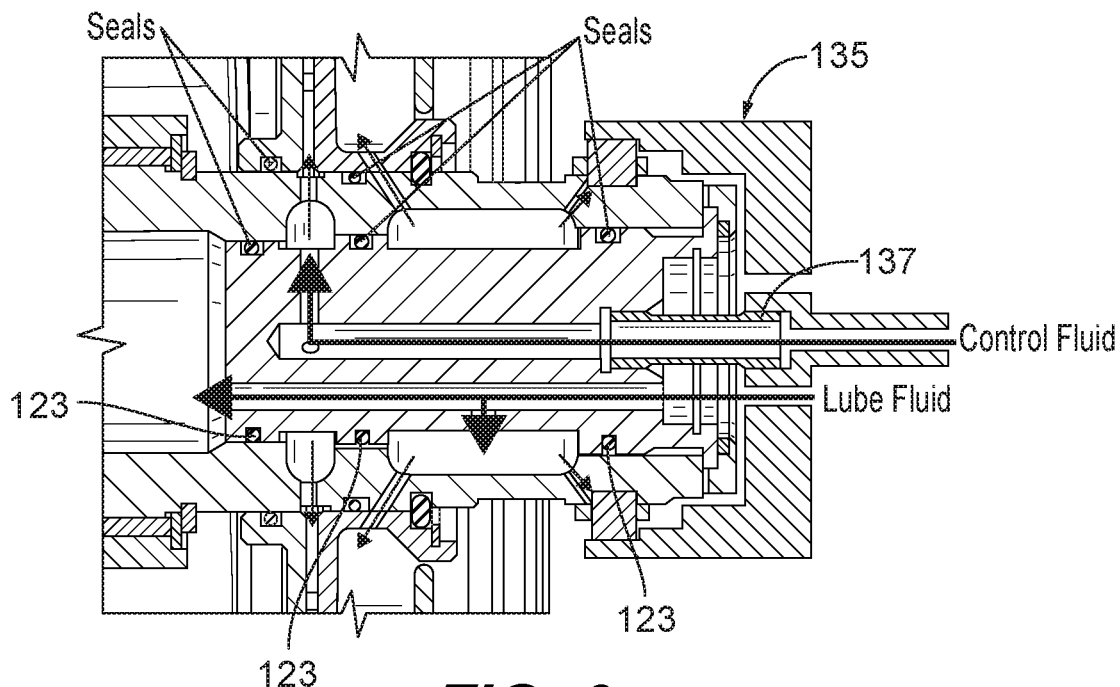
FIG. 6 is a partial cross-sectional view of the embodiment of FIG. 5, showing a housing attached to the shaft for fluidly isolating the control pressure flow path from the lubrication flow path.

The porting manifold 109, 209 can include one or more drive tabs 119 configured to limit insertion into the shaft 101, for example, and/or to connect the manifold 109, 209 to the shaft 101. The porting manifold 109, 209 can include a plurality of seal grooves 121. Referring additionally to FIGS. 5 and 6, the assembly 100 can include a plurality of manifold seals 123 disposed within the seal grooves 121 and configured to fluidly isolate the control pressure from the lubrication flow within the shaft 101. The assembly 100 can include any other suitable seals to isolate lubrication flow and control pressure (e.g., as shown in FIG. 5).

The assembly 100 can include a backstop 125 and a piston 127 disposed on the shaft 101. The backstop 125 can be fixed to the shaft 101 and the piston 127 can be slidably engaged to the shaft 101 to move relative to the shaft 101 and the backstop 125. The backstop 125 and the piston 127 can define a hydraulic cavity 129 therebetween in fluid communication with the one or more hydraulic ports 105 of the shaft 101.

As shown in FIG. 6, the assembly 100 can include a housing 135 configured to provide separate connections for the control pressure path 111 and the lubrication flow path 113. Any other suitable components are contemplated herein (e.g., a stem 137 as shown for connecting to the housing 135).

Figure 7:
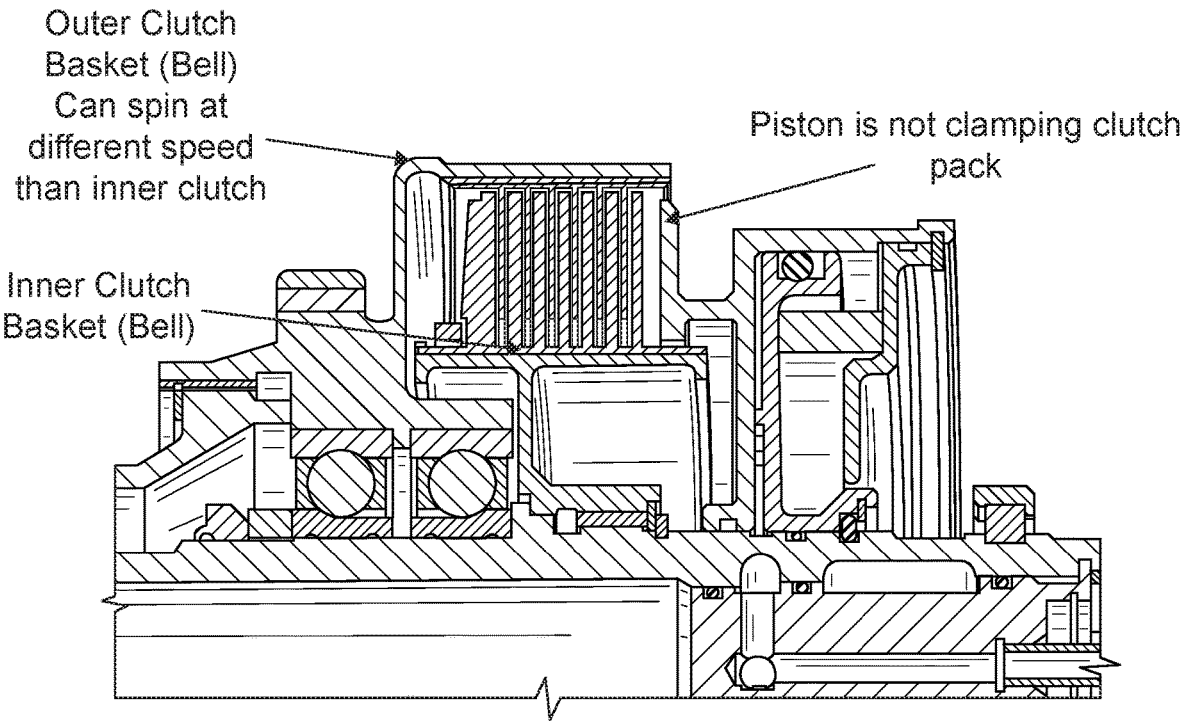
FIG. 7 is a partial cross-sectional view of an embodiment in accordance with this disclosure, shown in a retracted position where sufficient control pressure is not applied to the hydraulic cavity to overcome the bias of the spring.
Figure 8:
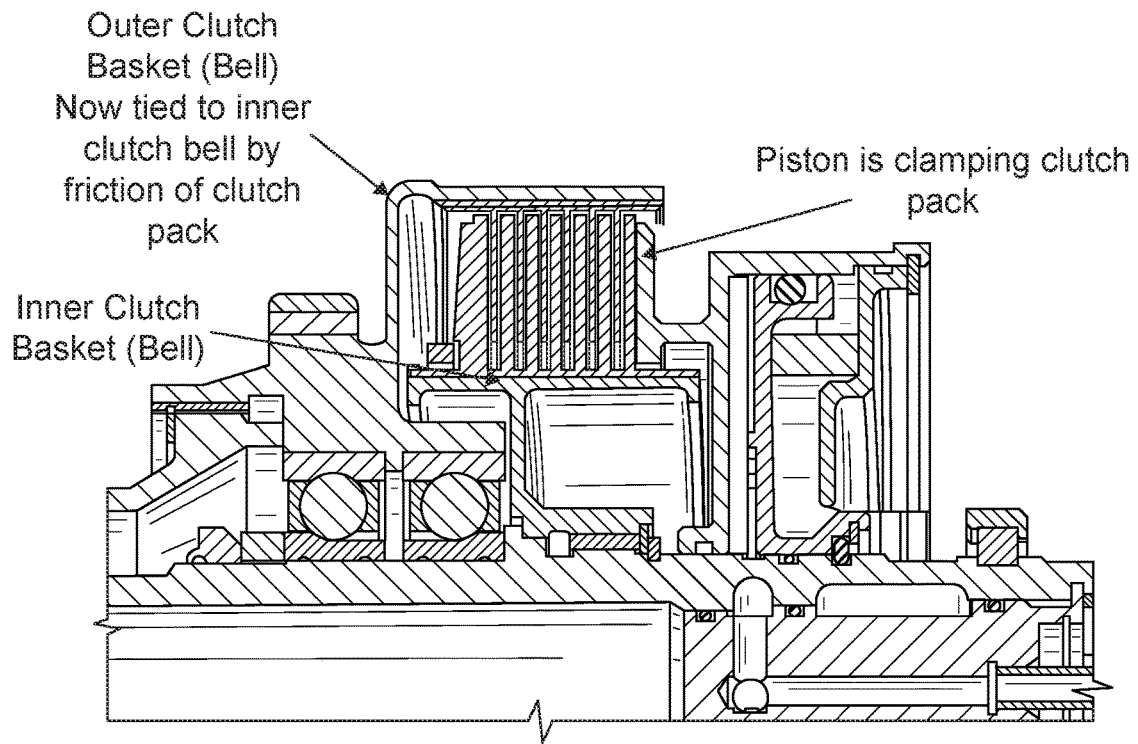
FIG. 8 is a partial cross-sectional view of an embodiment in accordance with this disclosure, shown in an engaged state where sufficient control pressure is applied to the hydraulic cavity to overcome the bias of the spring and to compress the clutch pack.

Referring to FIGS. 2, 7, and 8, the piston 127 can be configured to move between a retracted position (e.g., as shown in FIG. 7) and an engaged position (e.g., as shown in FIG. 8) wherein the piston 127 engages a clutch pack 131. As shown, the piston 127 can be slidably sealed to an outer diameter of the backstop 125 (e.g., via sliding seal 133).

The assembly 100 can include a balance dam 139 fixed to the piston 127 and disposed around a portion of the backstop 125 to define a lubrication cavity 141 between a back side of the backstop 125 and the balance dam 139. A spring 143 can be disposed between the back side of the backstop 125 and the balance dam 139 to bias the piston 127 to the retracted position. The spring 143 can be any suitable biasing member (e.g., a coil spring, a wavy washer spring). The spring 143 can push on the backstop 125 and the pressure dam 139 with any suitable force configured to be overcome by a suitable control pressure in the hydraulic cavity 129.

At least one lubrication hole 107 of the one or more lubrication holes 107 can be defined through the shaft 101 and through the backstop 125 to fluidly communicate with the lubrication cavity 141. The lubrication flow can be ported to the cavity 141 because control pressure can be intermittent and lubrication flow can be constant to prevent movement of the piston 127 toward the engaged position. Any other suitable lubrication holes are contemplated herein.

The assembly 100 can include an inner clutch basket 145 rotationally fixed to the shaft 101 to turn with the shaft 101. The assembly 100 can include an outer clutch basket 147 rotatably mounted on the shaft 101 to rotate relative to the shaft 101. The assembly 100 can include a clutch pack 131 disposed between the inner clutch basket 145 and the outer clutch basket 147. The clutch pack 131 can be configured to be compressed by the piston 127 in the engaged position (e.g., as shown in FIG. 8) to engage the inner clutch basket 145 to the outer clutch basket 147 to cause the outer clutch basket 147 to rotate with the inner clutch basket 145 and the shaft 100.

The clutch pack 131 can include a plurality of separator discs 149 slidably connected to the inner clutch basket 145 and a plurality of friction discs 151 connected to the outer clutch basket 147. The separator discs 149 can be pressed by the piston 127 to slide and contact the friction discs 151 to engage the separator discus 149 to the friction discs 151. It is contemplated that the friction discs 151 can be connected to the inner clutch basket 145 and the separator discs 149 can be connected to the outer clutch basked 147. Any other suitable arrangement and/or clutch pack type is contemplated herein.

The control pressure fluid and/or the lubrication fluid can be an oil, for example. Any other suitable fluid (e.g., hydraulic fluid).

In accordance with at least one aspect of this disclosure, a porting manifold, e.g., 109, 209 can be configured to be at least partially disposed within a shaft channel of a transmission shaft. The porting manifold can include any embodiment of a manifold disclosed herein (e.g., as described above). For example, the manifold can include a control pressure path configured to be in fluid communication with one or more hydraulic ports of the shaft, and a lubrication flow path configured to be fluid communication with one or more lubrication holes of the shaft. The control pressure path and the lubrication path can be fluidly isolated in the porting manifold.

Figure 9:
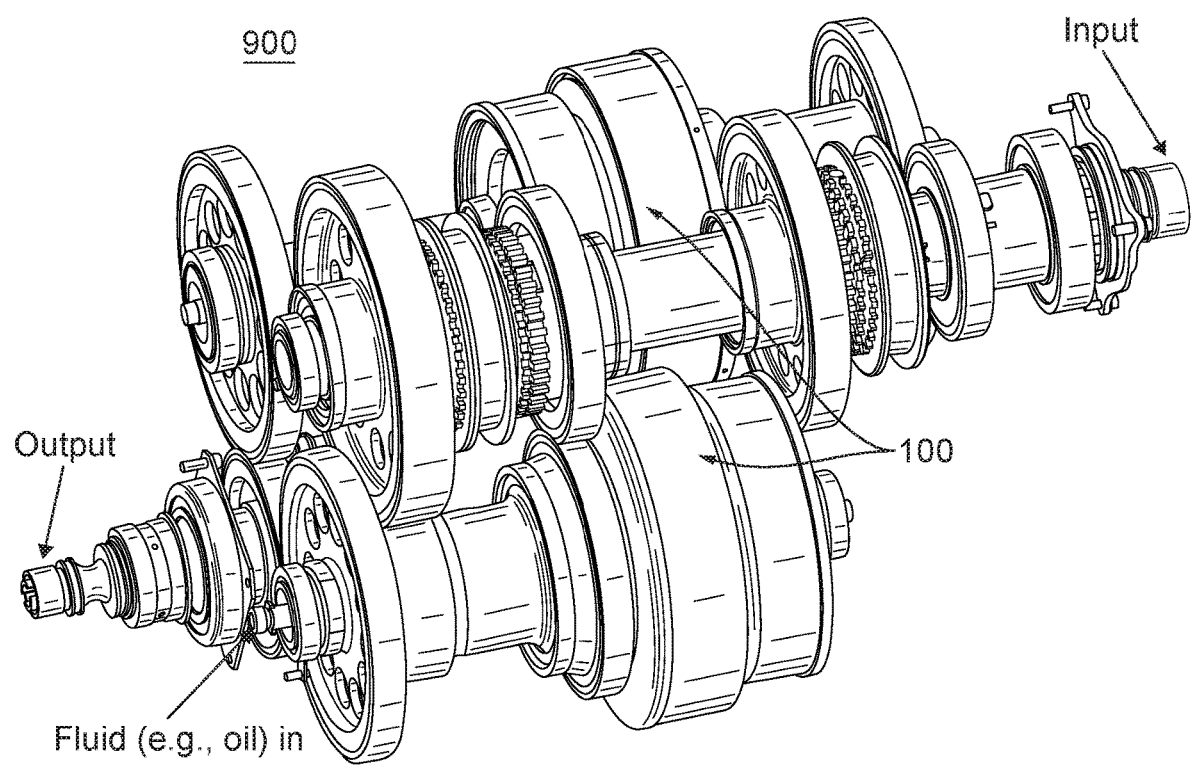
FIG. 9 is a perspective view of an embodiment of a transmission having an embodiment of a clutch assembly in accordance with this disclosure.

Referring additionally to FIG. 9, any suitable embodiment of an assembly, e.g., 100 can be utilized in a transmission 900. For example, transmission 900 can be attached to a low spool of a turbomachine engine. The transmission 900 can include any suitable number of staged (e.g., 4 stages as shown).

In accordance with at least one aspect of this disclosure, a method can include providing a hydraulic control pressure through a shaft of a transmission to control a position of a piston of a clutch assembly to selectively engage a clutch pack of the clutch assembly. The method can include providing a lubrication flow fluidly isolated from the control pressure through the shaft. The method can include any other suitable method and/or portion thereof.

In certain embodiments, then control pressure is low (e.g., less than the lubrication flow pressure), the clutch can be open and the outer clutch basket and inner clutch basket can rotate at different speeds. In certain embodiments, when control pressure is high (e.g., above lubrication flow pressure), the clutch can be closed and the outer clutch basket and inner clutch basket rotate at same speeds. Torque is then transmitted between inner and outer clutch basket.

Embodiments can utilize a clutch/piston arrangement in a low spool transmission on a jet engine accessory drive. Embodiments use hydraulic power to clamp and unclamp a clutch pack which selectively transmits torque between the inner and outer clutch bell. In certain embodiments, a piston return spring and a centrifugal pressure balance disc/dam ensures predictable operation across a wide operating speed band.

Embodiments include a suitable rotating clutch seal arrangement. Because control pressure and lubrication flow must be directed to the appropriate locations for proper operation, seals can be used to isolate the flow paths needed for proper clutch operation and to prevent unwanted leakage. As disclosed above, embodiments of a seal arrangement isolate two paths of flow/pressure. Embodiments allow for the movement of the clutch piston while sealing.

Figure 10:
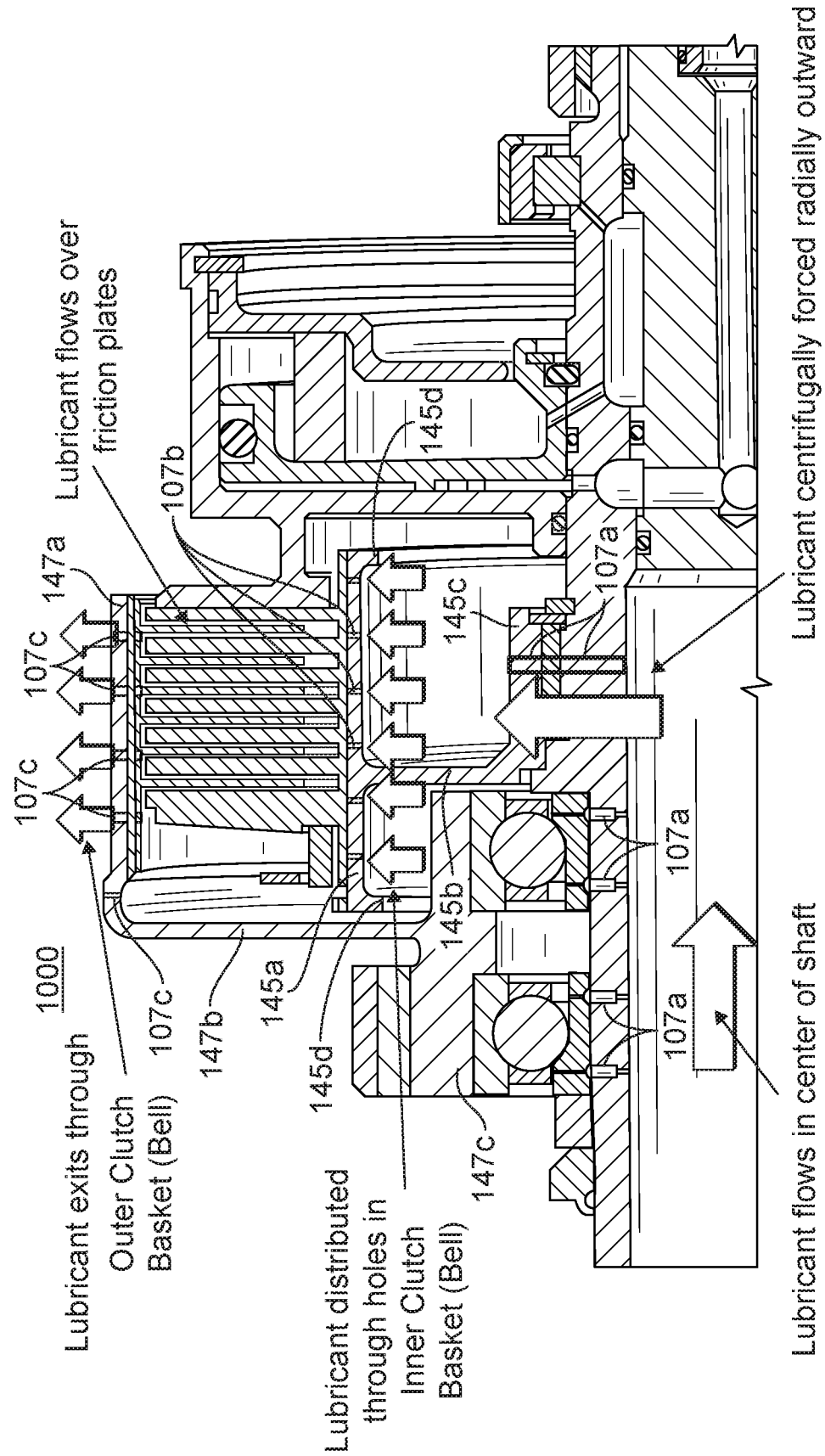
FIG. 10 is a partial cross-sectional view of an embodiment of a wet clutch in accordance with this disclosure.

Referring additionally to FIG. 10, a wet clutch assembly 1000 can include a clutch pack 131 having a plurality of friction members (e.g., friction discs 151) attached to a first clutch housing (e.g., outer clutch basket 147) and a plurality of separator members (e.g., separator discs 149) attached to a second clutch housing (e.g., inner clutch basket 145). The friction members and the separator members can be configured to be selectively contacted to each other to engage the first housing member to the second housing member (e.g., as described above with respect to the separator discs 149 and the friction discs 151). The clutch pack 131 can be in fluid communication with a lubrication source such that a lubrication flow can flow to the friction members and the separator members to remove heat and/or debris from the clutch pack 131 (e.g., which cleans the clutch pack 131 and/or prevents overheating).

The assembly 100 can be similar or the same as the assembly 100 describe above. The assembly 1000 can include a shaft 101 defining a shaft channel 103 and one or more clutch lubrication holes 107*a* defined through the shaft and positioned and configured to allow lubrication flow to travel to the clutch pack 131 from the shaft channel 103. The lubrication source can be in fluid communication with the shaft channel 103, as appreciated by those having ordinary skill in the art in view of this disclosure.

The first clutch housing can be an outer clutch basket 147 and the second clutch housing can be an inner clutch basket 145, for example. It is contemplated that the reverse can be true. The inner clutch basket 147 can include one or more flow holes 107*b* defined through a bell flange 145*a* of the inner clutch basket 145 to allow lubrication flow from the shaft 101 to pass through the bell flange 145*a* of the inner clutch basket 145 and into the clutch pack 131.

The inner clutch basket 145 can include one or more end lips 145*d* extending at least partially radially inward from the bell flange 145*a* and configured to retain lubricant axially over the flow holes 107*b* of the inner clutch basket 145, e.g., to improve lubricant distribution over the flow holes 107*b*. In certain embodiments, the one or more clutch lubrication holes 107*a* can be axially located within the axial length of the bell flange 145*a*. As shown, the bell flange 145 can extend from both sides of a support 145*b*. Any suitable shape of the bell flange 145*a* is contemplated herein. Any suitable number and/or position for the one or more flow holes 107*b* is contemplated herein.

The outer clutch basket 147 can include one or more exit holes 107*c* defined through an outer bell flange 147*a* thereof configured to allow lubrication flow to exit the clutch pack 131. The assembly 1000 can include one or more hydraulic ports 105 and a porting manifold (e.g., 109, 209) as disclosed herein, e.g., as described above. While the wet clutch 1000 is shown having hydraulic actuation, e.g., as disclosed above with respect to FIGS. 1-9, it is contemplated that the wet clutch assembly 1000 can be actuated in any other suitable manner (e.g., non-hydraulic actuation such as electric actuation or mechanical actuation).

In accordance with at least one aspect of this disclosure, a clutch basket (e.g., inner clutch basket 145 or outer clutch basket 147) for a wet clutch can include a bell flange (e.g., 145*a*, 147*a*) a support (e.g., 145*b*, 147*b*), and an inner diameter flange (e.g., 145*c*, 147*c*) connected to the bell flange by the support, and one or more flow holes (e.g., 107*b*, 107*c*) defined through the bell flange of the clutch basket to allow lubrication flow from a shaft to pass through the bell flange of the clutch basket (e.g., and into the clutch pack 131 or out of the clutch pack 131). The clutch basket can be an outer clutch basket 147 or an inner clutch basket 147, for example.

An inner clutch basket 145 can include one or more clutch lubrication holes 107*a* defined through the inner diameter flange 145*c* to allow lubrication flow from the shaft 101. As disclosed above, the inner clutch basket 145 can include one or more end lips 145*d* configured to retain lubricant axially over the flow holes 107*b* of the inner clutch basket 145, e.g., to improve lubricant distribution over the flow holes 107*b*, for example. As shown, the one or more clutch lubrication holes 107*a* can be axially located within the axial length of the bell flange 145*b* (e.g., so that lubricant from the shaft 101 will move radially outward onto an inner surface of the bell flange 145*b* and be retained by the lips 145*d* to collect as in a bowl).

In accordance with at least one aspect of this disclosure, an aircraft turbomachine transmission (e.g., transmission 900 as shown in FIG. 9) can include a wet clutch assembly, e.g., 1000. The wet clutch assembly, e.g., 1000 can include any suitable wet clutch assembly disclosed herein (e.g., as described above).

As shown in FIG. 10, lubricant (e.g., oil) can flow in the shaft 101 (e.g., from a pump). Lubricant can be centrifugally forced radially outward by the rotation of the shaft 101. Lubricant can then be distributed through flow holes 107b in inner clutch basket 145, and lips on edges of inner clutch basket 145 can create a cup to pool lubricant over the flow holes 107b. An amount of lubricant flow can be a function of shaft speed and pump flow, for example. Lubricant can flow over the friction/separator discs and exit through the outer clutch basket 147. Such flow can cool and clean the clutch pack 131, and help separate friction plates from steel separator plates to prevent unwanted contact.

Certain embodiments include a rotating wet clutch assembly that can be utilized on an aircraft low spool engine transmission. Embodiments can use lubrication fluid to cool the friction plates in the clutch pack and carry away debris. Heat can be better transmitted away from the friction discs which can improve the usable life of the clutch and/or reduce the size and weight of the friction discs and/or separator discs since less heat needs to be handled. Embodiments can be utilized in any suitable transmission, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A wet clutch assembly, comprising:
a clutch pack having a plurality of friction members attached to a first clutch housing and a plurality of separator members attached to a second clutch housing, the friction members and the separator members configured to be selectively contacted to each other to engage the first housing member to the second housing member, wherein the clutch pack is in fluid communication with a lubrication source such that a lubrication flow can flow to the friction members and the separator members to remove heat and/or debris therefrom; and
a shaft defining a shaft channel, and one or more clutch lubrication holes defined through the shaft and positioned and configured to allow lubrication flow to travel to the clutch pack from the shaft channel, wherein the lubrication source is in fluid communication with the shaft channel, wherein the first clutch housing is an outer clutch basket and the second clutch housing is an inner clutch basket, wherein the inner clutch basket includes one or more flow holes defined through a bell flange of the inner clutch basket to allow lubrication flow from the shaft to pass through the bell flange of the inner clutch basket and into the clutch pack, wherein the inner clutch basket includes an end lip at each end of the bell flange configured to retain lubricant axially over the flow holes of the clutch basket to improve lubricant distribution over the flow holes, wherein the one or more end lips bound an axial length of the bell flange.

2. The assembly of claim 1, wherein the one or more clutch lubrication holes can be axially located within the axial length of the bell flange.

3. The assembly of claim 1, wherein the outer clutch basket includes one or more exit holes defined through an outer bell flange thereof configured to allow lubrication flow to exit the clutch pack.

4. The assembly of claim 3, further comprising one or more hydraulic ports defined through the shaft and a porting manifold disposed at least partially within the shaft channel, wherein the porting manifold includes a control pressure path in fluid communication with the one or more hydraulic ports and a lubrication flow path in fluid communication with the one or more clutch lubrication holes, wherein the control pressure path and the lubrication path are fluidly isolated in the porting manifold.

5. An aircraft turbomachine transmission, comprising:
a wet clutch assembly, comprising:
a clutch pack having a plurality of friction members attached to a first clutch housing and a plurality of separator members attached to a second clutch housing, the friction members and the separator members configured to be selectively contacted to each other to engage the first housing member to the second housing member, wherein the clutch pack is in fluid communication with a lubrication source such that a lubrication flow can flow to the friction members and the separator members to remove heat and/or debris therefrom;
a shaft defining a shaft channel, and one or more clutch lubrication holes defined through the shaft and positioned and configured to allow lubrication flow to travel to the clutch pack from the shaft channel, wherein the lubrication source is in fluid communication with the shaft channel, wherein the first clutch housing is an outer clutch basket and the second clutch housing is an inner clutch basket, wherein the inner clutch basket includes one or more flow holes defined through a bell flange of the inner clutch basket to allow lubrication flow from the shaft to pass through the bell flange of the inner clutch basket and into the clutch pack, wherein the inner clutch basket includes an end lip at each end of the bell flange configured to retain lubricant axially over the flow holes of the inner clutch basket to improve lubricant distribution over the flow holes, wherein the end lips bound an axial length of the bell flange.

6. The transmission of claim 5, wherein the one or more clutch lubrication holes can be axially located within the axial length of the bell flange.

7. The transmission of claim 5, wherein the outer clutch basket includes one or more exit holes defined through an outer bell flange thereof configured to allow lubrication flow to exit the clutch pack.

8. The transmission of claim 7, further comprising one or more hydraulic ports defined through the shaft and a porting manifold disposed at least partially within the shaft channel, wherein the porting manifold includes a control pressure path in fluid communication with the one or more hydraulic ports and a lubrication flow path in fluid communication with the one or more clutch lubrication holes, wherein the control pressure path and the lubrication path are fluidly isolated in the porting manifold.

* * * * *